(No Model.)

A. FEDERICI.
BUILDING BLOCK.

No. 527,416.  Patented Oct. 16, 1894.

Witnesses
Alfred B. Watson
William M. Drew

Inventor
Antonio Federici
By John F. Kerr
Attorney

UNITED STATES PATENT OFFICE.

ANTONIO FEDERICI, OF PATERSON, NEW JERSEY.

BUILDING-BLOCK.

SPECIFICATION forming part of Letters Patent No. 527,416, dated October 16, 1894.

Application filed March 30, 1893. Serial No. 468,261. (No model.)

*To all whom it may concern:*

Be it known that I, ANTONIO FEDERICI, a citizen of the United States, residing at Paterson, in the county of Passaic and State of New Jersey, have invented certain new and useful Improvements in Building-Blocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my invention is to provide an artificial stone for building purposes which shall be durable and ornamental and which can be cheaply and easily manufactured.

The invention consists of a stone comprising the following elements: cement, sand, and pebbles, arranged as hereinafter described and shown in the accompanying drawings.

Figure 1:
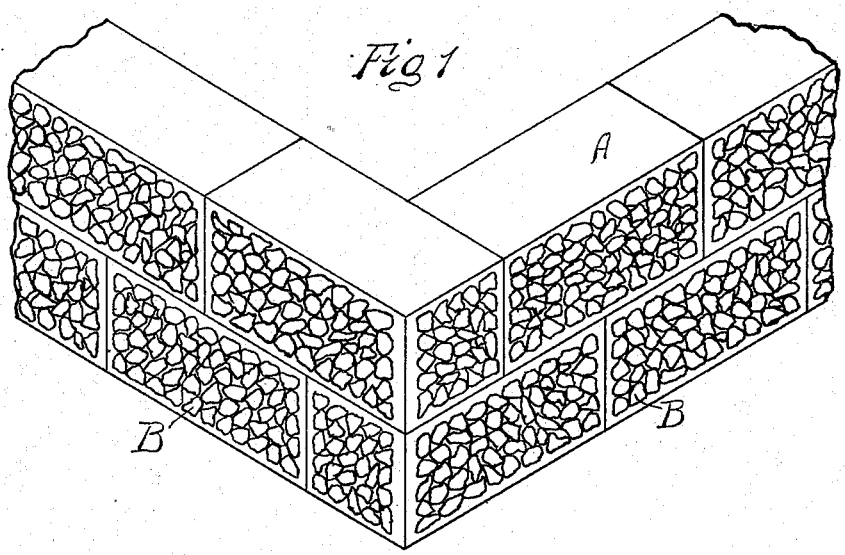
Figure 2:
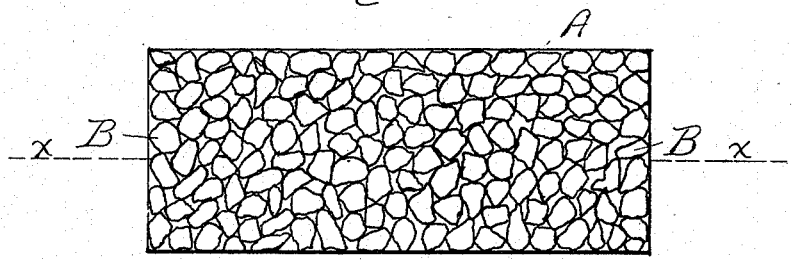
Figure 3:
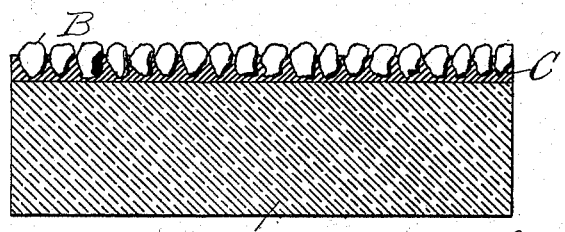

In the drawings Figure 1 represents the corner of a wall built with my artificial stone. Fig. 2 represents the face of a stone showing the pebbles. Fig. 3 is a view of a section of my artificial stone through the line X—X, Fig. 2.

—A— represents the stone; —B— the pebbles; —C— a layer of pure cement, and —D— represents the other portion of the stone which is composed of cement and sand.

The portion —D— of the stone is composed of Portland cement and the best sharp sand, which I mix in suitable proportions and make or mold in any suitable size or shape. I then prepare some pure Portland cement and spread a layer thereof upon that exposed surface of the portion —D— which is to form the face of the stone. While the material is yet plastic, assorted pebbles, B, are partially sunk into the central part of the face or faces of the stone, a margin on said face being left unpebbled as clearly shown in Fig. 1, although it is obvious that the whole surface, as shown in Figs. 2 and 3, may be covered without departing from the spirit of my invention. The block is then left until it hardens.

Fig. 3 shows the composition of my artificial stone, —D— being the portion composed of cement and hard sand, —C— being the layer of pure cement and —B— being the pebbles partially embedded therein.

When the stone is thoroughly dry and hardened the pebbles —B— cannot be extracted from the layer of cement —C— without breaking them.

I propose to use my artificial stone for building purposes for which it is peculiarly adapted, as the action of the weather produces no ill effect upon it; but by bleaching the pebbles rather enhances its beauty.

I am aware that in the construction of pavements, roadways, and walking surfaces, that gravel, sand and cement have been used for uniting the blocks or cobble-stones and that in some instances materials distinguished for their sharp, hard and angular and gritty character have been used in an artificial stone or a concrete walking surface, in order to prevent slipping, &c., and in other cases where metallic gratings have been combined with an under or body of cement or concrete; but I am not aware that a building block has ever been constructed with exposed surfaces consisting of very small pebbles partially embedded in a layer of pure cement.

I am also aware of a building block formed of a cement or concrete body with pieces of tiling, glass or other hard substances embedded therein flush with the surface of the sand; but in my stone the pebbles are very small and are only partially embedded in the layer of cement upon the exposed surfaces thereof.

I am also aware that it is not new to form a block for paving streets by covering a layer of bricks with cement and embedding therein a surface layer of cobble-stones of suitable size for resisting the wear incident to heavy traffic.

As I do not confine myself to pebbles of any particular color it is obvious that in ornamental trimmings on buildings, the arches, sills or cornices may be of variegated colors; and as I do not confine myself to any special shape, my artificial stone may be used in all sorts of mason work for walls, dwellings or other buildings, in all cases the faces or exposed portions of my stone being constructed substantially as above specified with pebbles, partially embedded in a layer of pure cement on said faces.

With the above description of my invention, what I claim is—

A new article of manufacture consisting of a building block, the body portion of which is composed of a comparatively coarse material, the face or exposed surface being composed of finer material, such as Portland cement, into the surface of which pebbles, of substantially uniform size, are partially embedded, substantially as and for the purpose set forth.

In testimony whereof I affix my signature in presence of two witnesses.

ANTONIO FEDERICI.

Witnesses:
G. J. KERR,
W. M. DREW.